United States Patent [19]
Kind et al.

[11] 3,758,790
[45] Sept. 11, 1973

[54] CIRCUIT ARRANGEMENT FOR THE CURRENT LIMITING INTERRUPTION OF CURRENT

[75] Inventors: Dieter Kind; Hagen Härtel, both of Braunschweig, Germany

[73] Assignee: Dieter Kind, Braunschweig, Germany

[22] Filed: July 21, 1972

[21] Appl. No.: 274,101

[30] Foreign Application Priority Data
July 23, 1971 Germany.................. P 21 36 865.0

[52] U.S. Cl. .............................. 307/136, 317/11 R
[51] Int. Cl. ............................................. H01h 9/30
[58] Field of Search.................... 307/134, 135, 136, 307/93, 94; 317/11 R, 11 A, 11 B, 11 C, 11 D, 11 E

[56] References Cited
UNITED STATES PATENTS
3,330,992   7/1967   Perrins.............................. 317/11 E FOREIGN PATENTS OR APPLICATIONS
681,210   1/1930   France............................ 317/11 R OTHER PUBLICATIONS
Auslegeschrift, 1272418, Kind et al., July 11, 1968, 3 pp. spec., 1 sheet dr.

*Primary Examiner*—J. V. Truhe
*Assistant Examiner*—M. Ginsburg
*Attorney*—George H. Spencer et al.

[57] ABSTRACT

A circuit arrangement for current limiting interruption of currents at high voltages in a network includes a current limiting circuit having a commutation switch and a residual current switch connected in series to a nodal point of the network. An energy dissipating resistor is connected in parallel with the commutation switch. A commutation capacitive circuit, which includes a capacitor, is connected across the commutation switch. The capacitor is of such size that the current to be interrupted is forced, after the capacitor becomes charged, to commutate to the parallel connected resistor. The current magnitude is thus reduced to a residual current which can be interrupted by the residual current switch. A plurality of separating switches are separately connected between the nodal point and respective main lines. A plurality of auxiliary switches are separately connected from each of the main lines via the commutating switch and the residual current switch to the nodal point. In order to interrupt the current flow in any of the main lines, the auxiliary switch associated with the selected main line is closed and thereafter its associated separating switch, the commutation switch and the residual current switch opened in succession in the order named.

8 Claims, 5 Drawing Figures

CIRCUIT ARRANGEMENT FOR THE CURRENT LIMITING INTERRUPTION OF CURRENT

BACKGROUND OF THE INVENTION

This invention relates to a circuit arrangement for the current limiting interruptions of direct and alternating currents at high voltage at points of intersection in a network. The present invention relates, more particularly, to a circuit arrangement for the current limiting interruption of direct and alternating currents at high voltage at points of intersection in a network in which a switch (commutation switch) is connected in parallel with a capacitor of such size that the current to be interrupted is forced, after charging the capacitor, to commutate to a parallel path having a high resistance (absorber circuit) so that the current level is reduced to a residual current which is interrupted by an additional switch (residual current switch).

A circuit arrangement for the current limiting interruption of direct and alternating currents at high voltage is known in which a commutation switch is connected in parallel with a capacitor which removes current from the switch and which is charged by the current to be switched off to such a high voltage that this current commutates to a parallel connected high-ohmic resistor (energy absorber) and is reduced to an easily interruptable residual current value. Such a circuit arrangement is disclosed in the publication ETZ/A, volume (1968), pages 421-423.

A circuit arrangement, particularly suited for the residual current interruption has been disclosed in the Federal Republic of Germany Pat. No. 1,272,418. As shown in the German patent, the circuit arrangement includes a residual current switch with a parallel excess voltage protection circuit consisting of series connected spark quenching paths, a resistor and a capacitor.

SUMMARY OF THE INVENTION

It is an object of the present invention to provide a circuit arrangement for current limiting interruption of current in which the commutating switch and residual current switch do not carry currents except during periods when current interruption is desired.

It is another object of the present invention to provide a circuit arrangement for current limiting interruption in which current interruption in a selected branch of a number of branches on a network may be accomplished with a single current limiting circuit.

It is a further object of the present invention to provide a circuit arrangement for current limiting interruption which has few parts and is inexpensive to construct.

The foregoing objects, as well as others which will become apparent from the text below, are accomplished in accordance with the present invention by providing a circuit arrangement for current limiting interruption of currents at high voltages in a network. The circuit arrangement includes a current limiting circuit having a commutation switch and a residual current switch connected in series to a nodal point of the network. An energy dissipating resistor is connected in parallel with the commutation switch. A commutation capacitive circuit, which includes a capacitor, is connected across the commutation switch. The capacitor is of such size that the current to be interrupted is forced, after the capacitor becomes charged, to commutate to the parallel connected resistor. The current magnitude is thus reduced to a residual current which can be interrupted by the residual current switch. A plurality of separating switches are separately connected between the nodal point and respective main lines. A plurality of auxiliary switches are separately connected from each of the main lines via the commutating switch and the residual current switch to the nodal point. In order to interrupt the current flow in any of the main lines, the auxiliary switch associated with the selected main line is closed and thereafter its associated separating switch, the commutation switch and the residual current switch opened in succession in the order named.

It is a desirable characteristic of practical embodiments of the present invention that a single current limiting circuit comprising a single commutation capacitor, a single energy absorbing circuit and a single residual current switch are provided. In operation the central current limiting circuit is selectively connected into the current branch to be cut off by opening a separating switch disposed in the selected main line and by closing an auxiliary switch disposed in an ancillary line associated with the selected main line. Other separating switches and other residual current switches are disposed respectively in other main lines and ancillary lines, so that current can be interrupted in other branches by cOnnecting the current limiting circuit into these branches as well. The single commutation circuit can as well also include, if desired, a single excess voltage protection circuit.

DETAILED DESCRIPTION OF THE PREFERRED EMBODIMENTS

Figure 1:
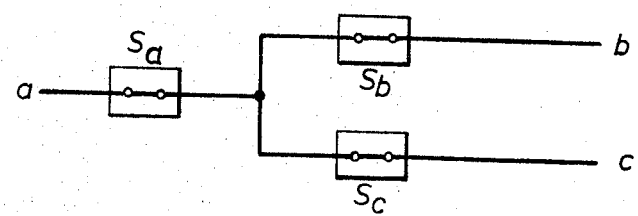
FIG. 1 is a schematic diagram of a known network having a nodal point and including individual switches in the individual branches.

As shown in FIG. 1 a known generalized simple network for current distribution includes main lines a,b and c, each connected via respective switches $S_{ab}$ and $S_c$ to an intersecting point, hereinafter denominated as a node point. In order to interrupt current flowinG in any one of the main lines a, b or c, it is necessary to open one or another of the switches $S_a$, $S_b$ or $S_c$. It is to be aPpreciated that special considerations must be taken into account if the currents sought to be interrupted are large and high voltages are involved.

Figure 2:
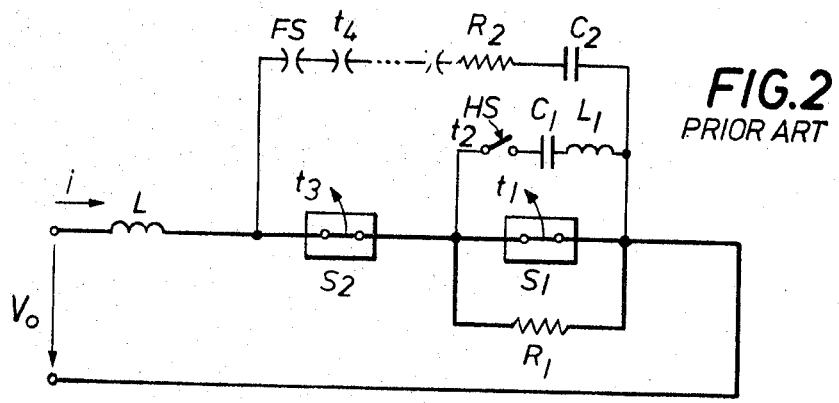
FIG. 2 is a schematic diagram of a known current limiting circuit arrangement.

In order to facilitate understanding of the present invention, the known current limiting circuit arrangement illustrated in FIG. 2 shall first be described in which $V_0$ is the driving voltage, which drives initially a current $I_0$ to be cut off through an inductance L, a residual current switch $S_2$ and a commutation switch $S_1$. A commutation capacitor $C_1$ and an energy dissipating resistor $R_1$ are each separately connected in parallel with the commutating switch $S_1$. The energy dissipating resistor $R_1$ is preferably a current dependent resistor. An auxiliary switch HS and an inductance $L_1$ are connected in series with the commutation capacitor $C_1$. A known excess voltage protection circuit is connected in parallel with the series connected switches $S_1$ and $S_2$; this circuit includes a series connection of a spark path FS, a current limiting resistor $R_2$ and a capacitor $C_2$. The spark path, as illustrated, is formed by a plurality of series connected spark gaps.

Figure 4:
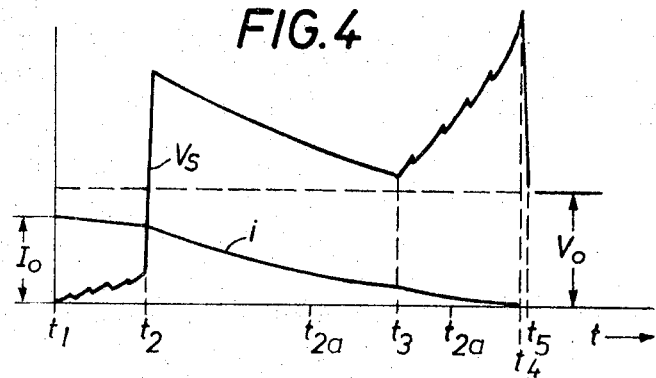
FIG. 4 is a graphic representation of current and voltage levels plotted against time helpful in understanding the operation of the circuits of FIGS. 2 and 3.

According to FIG. 4 the initial current $I_0$, which is to be cut off in the circuit of FIG. 2, flows during a period of time preceding time $t_1$. At time $t_1$ the commutation switch $S_1$ opens and produces an arc voltage; after several ms, at time $t_2$, the auxiliary switch HS closes. The current commutates into the commutation capacitor $C_1$ and charges it. Depending on the voltage across the commutation capacitor $C_1$, the current i is commutated to the preferably current dependent, energy dissipating resistor $R_1$ which is so designed that for a current level $I_0$, $R_1(I_0) \cdot I_0 > V_0$ so that the current i can be reduced. If the current i has dropped approximately to the residual value $I_R$, $I_R = V_0/R(I_R)$ which, depending on the size of the energy dissipating resistor $R_1$, is several percent to several ten percent of the initial current $I_0$, the residual current switch $S_2$ is opened at time $t_3$ and produces, in cooperation with the series connected energy dissipating resistor $R_1$, a voltage greater than the driving voltage $V_0$ which further reduces the current i. If undue excess voltages are produced across the switching circuit which includes the commutation switch $S_1$, and the residual current switch $S_2$, the excess voltage protection circuit responds at time $t_4$. The series connection of the spark path FS, the current limiting resistor $R_2$ and the capacitance $C_2$ produces a voltage directed opposite to the excess driving voltage, absorbs the residual energy and finally switches off the current i at time $t_5$.

Figure 3:
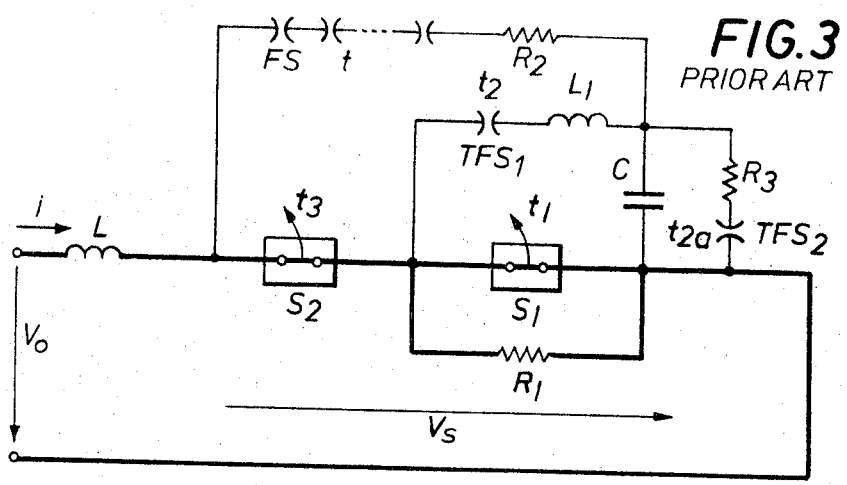
FIG. 3 is a schematic diagram of a current limiting circuit arrangement which is somewhat modified, compared to that of FIG. 2, in which a commutation capacitor for the current to be switched off is also used as part of an excess voltage protection circuit.

Since the capacitors required for the commutation and the excess voltage protection circuit have approximately the same capacitance value at approximately the same rated voltages, a single capacitor C can, as shown in FIG. 3, perform both functions in time succession during the switching process, as known for similar functions from German Laid Open Patent Application (Offenlegungsschrift) No. 1,812,599.

In the circuit arrangement shown in FIG. 3, compared to that of FIG. 2, the auxiliary switch HS (FIG. 2) is replaced by a triggered spark path $TFS_1$ connected in series with the inductance $L_1$. Furthermore, the commutation capacitor C is connected in parallel with a discharge resistor $R_3$ via a further triggered spark path $TFS_2$. This circuit arrangement operates similarly as that of FIG. 2. After opening the commutation switch $S_1$ at time $t_1$ the spark path $TFS_1$ is triggered at time $t_2$ for example, after a certain arc voltage has been reached and the current i is commutated to the commutation capacitor C so that the latter is charged.

After commutation to the current dependent, energy dissipation resistor $R_1$ the current i drops to a few percent of the initial current $I_0$, whereupon the residual current switch $S_3$ is actuated at time $t_3$. During the period from time $t_2$ to time $t_4$, the spark path $TFS_2$ (actuated for example by the arc voltage at the residual current switch $S_2$) is triggered at time $t_{2a}$ (FIG. 4) and the commutation capacitor C is consequently discharged via the resistor $R_3$. The discharge process must be completed before time $t_4$ and the spark paths $TFS_1$ and $TFS_2$ must have reached their full restabilization before time $t_4$. The final interruption of the current i then takes place, as in the circuit of FIG. 2, at time $t_5$. A circuit arrangement which includes $S_1$, $S_2$, and HS is disclosed in the publications DIRECT CURRENT, volume (1966), pages 3-6 and ETZIA, volume (1968) pages 421–423.

Figure 5:
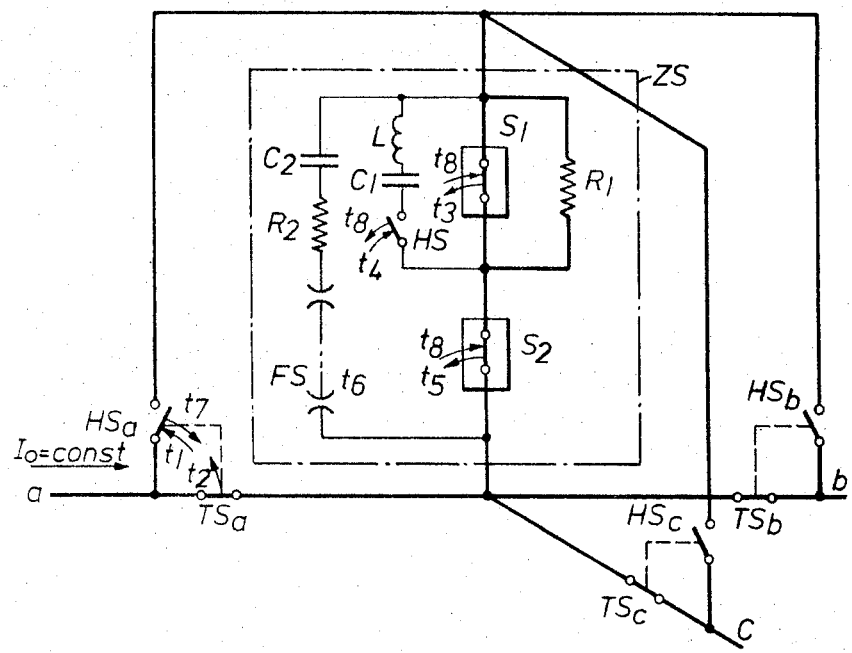
FIG. 5 is a schematic diagram of an embodiment of the present invention in which all significant functions of the current limitation are centralized, the current limiting circuit according to FIG. 2 being used as the central current limiting arrangement.

FIG. 5 shows a circuit arrangement for current limiting interruption of currents according to the present invention in which all significant current limiting functions for a plurality of branches of a network are performed in the circuits of a single central current limiting switching unit ZS. The central current limiting switching unit ZS, as illustrated, is the circuit shown in FIG. 2. It is to be appreciated that the circuit of FIG. 3, if desired, could also equally well be used for the switching unit ZS.

For purpose of illustration, it is assumed that current is to be interrupted in branch a (FIG. 5) at time $t_1$, an auxiliary switch $HS_a$ closes and shortly thereafter, at time $t_2$, a separating switch $TS_a$ opens. The initial current $I_0$ is diverted through the central switching unit ZS. At time $t_3$ the commutation switch $S_1$ opens and after closing of the auxiliary switch HS at time $t_4$ the current i commutates to the commutation capacitor $C_1$ and finally to the current dependent, energy dissipating resistor $R_1$. At time $t_5$ the residual current switch $S_2$ opens and at time $t_6$ the excess voltage protection circuit FS, $R_2$, $C_2$ responds.

After the final switching off of the current i by the excess voltage protection circuit FS, $R_2$, $C_2$, the auxiliary switch $HS_a$ is opened at time $t_7$ and thereafter, at time $t_8$, the commutation switch $S_1$ and the residual current switch $S_2$ are closed. The central switching unit ZS is thus prepared for a new switch-off action. The new switch-off actions may again involve the main line a, or any other line connected to the nodal point, such as the main lines b and c which are connected respectively to the nodal point via respective separating switches $TS_b$ and $TS_c$. As shown, the main lines b and c are also connected respectively to one end of the switching unit ZS via respective auxiliary switches $HS_b$ and $HS_c$, the other end of the switching unit ZS being connected to the nodal point.

Since the commutation switch $S_1$ and the residual current limiting switch $S_2$ need no longer be designed for continuous currents, as in the prior art circuit of FIG. 2, the required functions can be performed with considerably less expensive components. The construction requirements for the auxiliary switches $HS_a$, $HS_b$ and $HS_c$ and the separating switches $TS_a$, $TS_b$ and $TS_c$ also are low. The auxiliary switches $HS_a$, $HS_b$ and $HS_c$ which constitute respective separating paths before the onset of respective switching actions, must conduct the full initial current $I_0$ for a few tens of milliseconds and must again constitute a separating path after the respective switching actions. The separating switches $TS_a$, $TS_b$ and $TS_c$ must carry the respective continuous line currents before the respective switching actions, must commutate the current to be cut off into a short-circuit connection during the switch off and must constitute respectively a separating path after the switch off action. Moreover the separating switches $TS_a$, $TS_b$ and $TS_c$ must be able to switch on rated currents at rated voltage.

It will be understood that the above description of the present invention is susceptible to various modifications, changes and adaptations, and the same are intended to be comprehended within the meaning and range of equivalents of the appended claims.

We claim:

1. In a circuit arrangement for the current limiting interruption of currents at high voltages in a network, the arrangement including a current limiting circuit having commutation switch means and residual current switch means connected in series with one another to a nodal point of said network, energy dissipating resistive circuit means connected in parallel with said commutation switch means and commutation capacitive circuit means coupled across said commutation switch means, the capacitive circuit means having capacitance of such size that the current to be interrupted is forced, after said capacitance becomes charged, to commutate to the parallel connected energy dissipating resistive circuit means so that the current magnitude is reduced to a residual current which may be interrupted by said residual current switch means, the improvement comprising a plurality of separating switch means separately connected between said nodal point and respective main lines, and a plurality of auxiliary switch means separately connected from each respective one of said main lines via the series connected said commutation switch means and said residual current switch means to said nodal point, whereby any one of said plurality of auxiliary switch means may be closed and thereafter the associated separating switch means of said plurality of separating switch means, said commutation switch means and said residual current switch means opened in succession in the denominated order to interrupt the current flow in any selected one of said main lines.

2. A circuit arrangement as defined in claim 1 wherein said current limiting circuit further comprises an excess voltage protection circuit means coupled in parallel with the series connected said commutation switch means and said residual current switch means.

3. A circuit arrangement as defined in claim 2 wherein said excess voltage protection circuit means comprises a capacitor, and a spark path means connected in series.

4. A circuit arrangement as defined in claim 3 wherein said capacitor of said excess voltage protection circuit means is a part of said commutation capacitive circuit means and constitutes the capacitance thereof and further comprising a spark path means connected in parallel with said capacitor for discharging said capacitor subsequent to its charging and the opening of said commutation switch means.

5. A circuit arrangement for the current limiting interruption of current at high voltage flowing in a main line comprising, in combination:
  a. normally closed separating switch means connected between said main line and a circuit point; and
  b. normally open auxiliary switch means and current limiting circuit means connected in parallel with said separating switch means, said current limiting circuit means including:
    1. commutation switch means and residual current switch means coupled in series with one another between said auxiliary switch means and said circuit point,
    2. energy dissipating resistive circuit means coupled in parallel with said commutation switch means, and
    3. commutation capacitance circuit means coupled in parallel with said commutation switch means; whereby current flowing between said main line and said circuit point may be interrupted by closing said auxiliary switch means and thereafter opening said separating switch means, said commutation switch means and said residual switch means in succession in the denominated order.

6. A circuit arrangement as defined in claim 5 wherein said current limiting circuit means further includes:
    4. excess voltage protection circuit means coupled in parallel with the series coupled said commutation switch means and said residual current switch means.

7. A circuit arrangement as defined in claim 6 wherein said excess voltage protection circuit means includes first spark path means and a capacitor, said capacitor forming the capacitance of said commutation capacitance circuit means, and further comprising additional spark path means connected across said capacitor for discharging said capacitor subsequent to its charging and the opening of said commutation switch means.

8. A circuit arrangement as defined in claim 5 further comprising additional main lines connected to said circuit point, respective additional separate normally closed separating switch means connected between said circuit point and respective ones of said additional main lines, and respective additional separate normally open switch means connected between respective ones of said additional main lines and said current limiting circuit means, whereby the current flowing in any of the main lines may be interrupted.

* * * * *